Patented June 20, 1944

2,351,686

UNITED STATES PATENT OFFICE 2,351,686

MEANS AND METHOD OF PREVENTING THE SPREAD OF DISEASE

Otto A. Kohl, Cedar Rapids, Iowa

No Drawing. Application October 8, 1941, Serial No. 414,093

2 Claims. (Cl. 21—60.5)

This invention relates to means for controlling and preventing the spread of disease and various forms of parasites in poultry flocks.

It is well known that many kinds of diseases and parasites, including bacterial diseases, worms, and protozoan diseases are transferred and spread primarily through poultry droppings. The bacteria, protozoan organisms, or eggs, as the case may be, which are discharged with the poultry droppings, are transferred to other poultry by being eaten by other fowls, by being picked up on the feet, and sometimes transferred to drinking vessels and the like or by transfer through some intermediary such as earth worms, roaches, and many other types of insects.

Of these various poultry parasites, the protozoan disease termed coccidiosis, will be considered in exemplifying the applicant's method of controlling the spread of such diseases. A relatively high rate of mortality sometimes results from coccidiosis, especially in young chickens.

The life cycle of the protozoan causing this particular disease normally requires from eight to fifteen days, during which time the disease organism is taken in by the chicken, the protozoan organism developed rapidly and multiplied within the intestines of the chicken and an organism termed an oocyst expelled with the poultry droppings. These oocysts or eggs, as they may be called, are not particularly dangerous in themselves until they have undergone a process known as sporulation. Quoting from a work on "Poultry Husbandry" by Morley A. Jull:

"When devoured by a chicken along with feed, the sporocysts, in the intestinal tract, give rise to spindle-shaped bodies called 'sporozoites,' which are released from the oocyst shell and enter the epithelial cells of the walls of the intestine where they finally develop into schizonts, which in turn give rise to merozoites. While embedded in the epithelial cells of the walls of the chicken's intestine the merozoite develops into a schizont so that the usual cycle involves the development of schizonts into merozoites and back again into schizonts, this repeated process causing severe damage to the mucous membrane of the wall of the intestine of the chicken. The sexual cycle emerges when the merozoites, instead of forming schizonts, give rise to the formation of male and female cells, which unite to produce oocysts. The oocysts are expelled with the chicken's droppings and upon sporulation become infective organisms ready to be devoured by the chicken to carry on further reinfestation."

It will be understood, therefore, that the dangerous portion of this disease is during the second portion of the life cycle of the organism and therefore the best control of the disease may be had by preventing, to as great an extent as possible, the sporulation of the oocysts. This second cycle of the disease is transferred by self-infection of the chicken from poultry droppings. However, the sporulation of the oocysts, as mentioned above, takes place only under favorable environment and conditions. These favorable conditions generally include dirt, filth and dampness, and the usual method of controlling the disease is to attempt to keep the poultry yard clean and dry.

It is a main object of my invention to provide a new and improved method of controlling the spread of such diseases in poultry flocks and to employ in connection with this method a material readily obtainable in large quantities at low cost.

Another object of my invention is the provision of a method employing a material, for the purpose mentioned, which may thereafter be used as a very excellent fertilizer.

Other and further features and objects of the invention will be more apparent to those skilled in the art upon a consideration of the following specification, wherein is disclosed a single exemplary application of my method, with the understanding, however, that such changes may be made in the application of this method as fall within the scope of the appended claims, without departing from the spirit of the invention.

In order to prevent sporulation of the oocysts and prevent reinfection of the chicken, I have invented a means for and method of drying out and absorbing the droppings containing the oocysts and neutralizing and destroying and so absorbing the oocysts as to render them harmless and inaccessible to contact by the chickens.

I have found that diatomaceous earth, due to its very great absorbent quality, can be employed as an excellent means of preventing the multiplication of bacteria and the prevention of the development of various disease organisms such as the sporulation of the oocyst above mentioned. This diatomaceous earth is readily obtainable in large quantities in many parts of the country and I have found that by applying this material in pieces or lumps approximately one inch in size to the floor of chicken brooders or chicken houses and yards, the spread and development of diseases such as coccidiosis is prevented or greatly restricted.

The bacteria, eggs, or other organisms from the droppings of poultry are absorbed to a large extent by the extremely absorbent diatomaceous earth which will frequently hold well over its own weight in moisture. Such conditions are very poor for the development and spread of the disease organisms. It is believed, for one thing, that the conditions are very unfavorable for the sporulation of the oocyst in the case of the disease called coccidiosis. Furthermore, when the disease organisms are absorbed by the lumps of diatomaceous earth, these organisms are, for the most part, placed beyond the possibility of contact with the feet of poultry and thus the possibility of reinfection is greatly diminished. The use of this material as a covering in chicken houses or chicken yards serves to keep the floor or yard clean and dry. In addition, the material absorbs to a great extent the odor normally associated with chicken enclosures. Furthermore, the diatomaceous earth is entirely fireproof as contrasted with straw or other similar material which has sometimes been used as floor covering. Diatomaceous earth does not have the objectionable feature of straw or the like, which material tends to promote the development and spread of fungus diseases.

Diatomaceous earth, after having been used as a floor or poultry yard covering for a period of eight weeks or thereabouts, absorbs considerable amounts of nitrogen, phosphorus, and other useful materials which make it an excellent fertilizer.

Although I have described my new method for the prevention and control of the spread of more or less specific diseases or types of disease, it is apparent that the material under consideration may serve just as effectively in preventing the spread and controlling other types of poultry or animal diseases. It is apparent, therefore, that modifications of my method may be employed by those skilled in the art without departing from the scope of the appended claims.

I claim as my invention:

1. The method of protecting poultry from diseases that are spread through poultry droppings, which comprises covering ground or floor surfaces in poultry yards or houses with a layer of lumps of diatomaceous earth to collect such droppings thereon and absorb moisture therefrom, whereby said surfaces may be kept clean and dry.

2. In a poultry inclosure, a floor having thereover a layer of diatomaceous earth in the form of relatively coarse graded lumps for collecting poultry droppings and absorbing moisture therefrom to aid in keeping said floor clean and dry and thereby preventing the spread of disease among the poultry.

OTTO A. KOHL.